United States Patent [19]

Reinmoeller

[11] 4,299,316
[45] Nov. 10, 1981

[54] ADJUSTABLE SEAT PARTICULARLY IN MOTOR VEHICLES

[75] Inventor: Adolf Reinmoeller, Remscheid, Fed. Rep. of Germany

[73] Assignee: Keiper Automobiltechnik GmbH & Co. KG, Remscheid, Fed. Rep. of Germany

[21] Appl. No.: 110,385

[22] Filed: Jan. 7, 1980

[30] Foreign Application Priority Data

Jan. 13, 1979 [DE] Fed. Rep. of Germany ....... 2901208

[51] Int. Cl.³ ...................... F16D 21/02; A47C 1/024
[52] U.S. Cl. ............................ 192/48.8; 74/665 GA; 192/30 W; 192/93 B; 192/94; 297/330
[58] Field of Search .................... 74/665 GA; 49/136; 192/30 W, 48.8, 48.2, 48.9, 93 B, 94; 297/330

[56] References Cited

U.S. PATENT DOCUMENTS

| | | | |
|---|---|---|---|
| 2,629,428 | 2/1953 | Luketa | 297/330 X |
| 2,668,581 | 2/1954 | Luketa | 297/330 X |
| 3,004,757 | 10/1961 | Lohr | 49/136 |
| 3,866,477 | 2/1975 | Schmid et al. | 192/48.8 X |
| 4,094,024 | 6/1978 | Benoit et al. | 192/93 B X |

*Primary Examiner*—Allan D. Herrmann
*Attorney, Agent, or Firm*—Michael J. Striker

[57] ABSTRACT

The adjustable seat having a plurality of position adjusters, such as a backrest adjuster, a front vertical adjuster, a rear vertical adjuster, and a longitudinal-horizontal adjuster includes a common driving motor which is coupled to individual adjusters by means of a power distributing gear unit including a plurality of driving shafts supporting for free rotation meshing gears which are in permanent engagement with a driving pinion of the driving motor. Each of the driving shafts also supports for joint rotation axially movable coupling discs which are normally disengaged from the assigned gears. The gear unit includes a control unit assembled of a plurality of mechanical control devices, each including cam surfaces linked to the coupling discs and being conservatively activated by a sliding member driven by an additional adjustment motor. The sliding member also controls an indication circuit which indicates the individual operative position of respective driving shafts.

8 Claims, 6 Drawing Figures

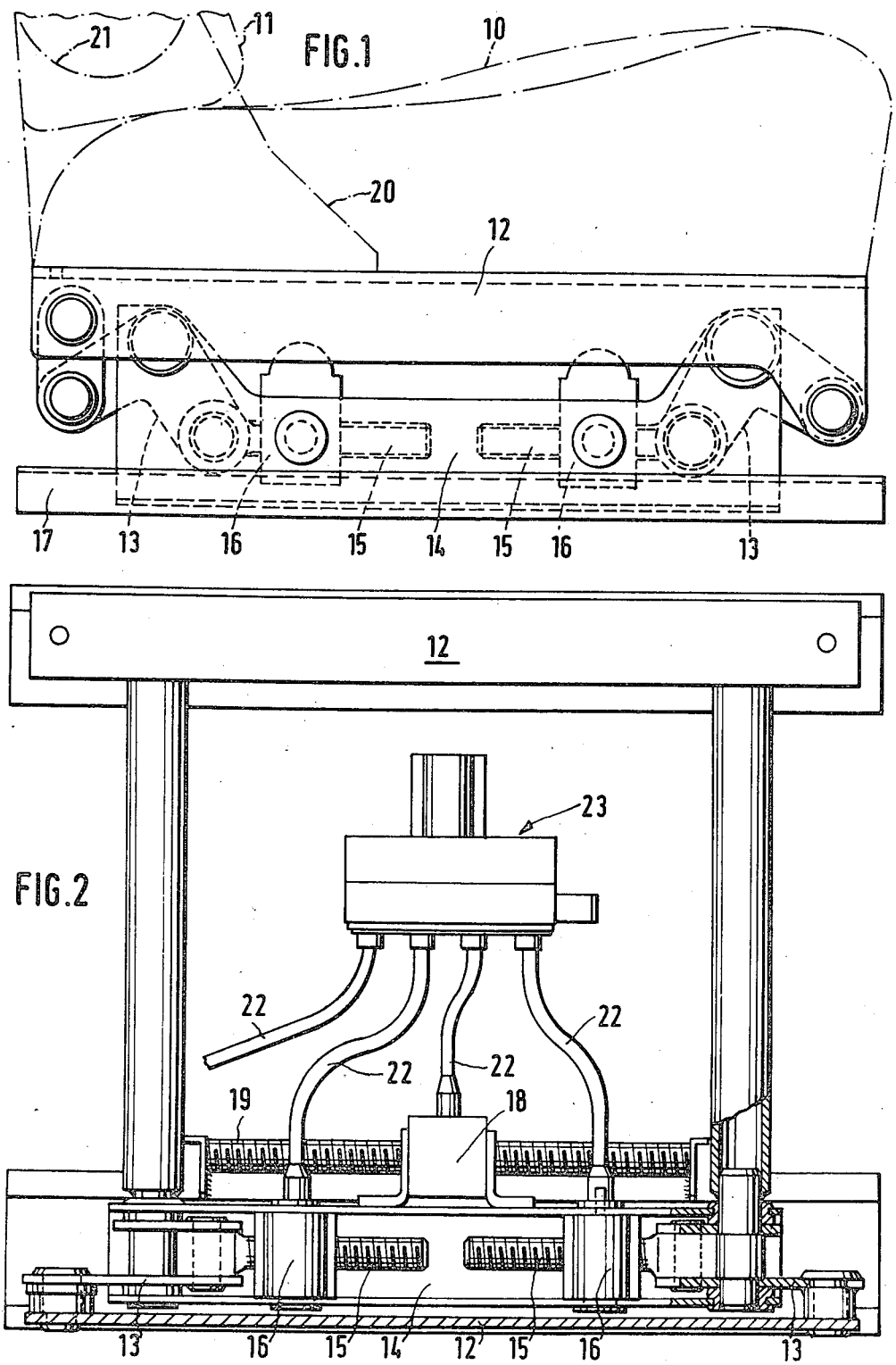

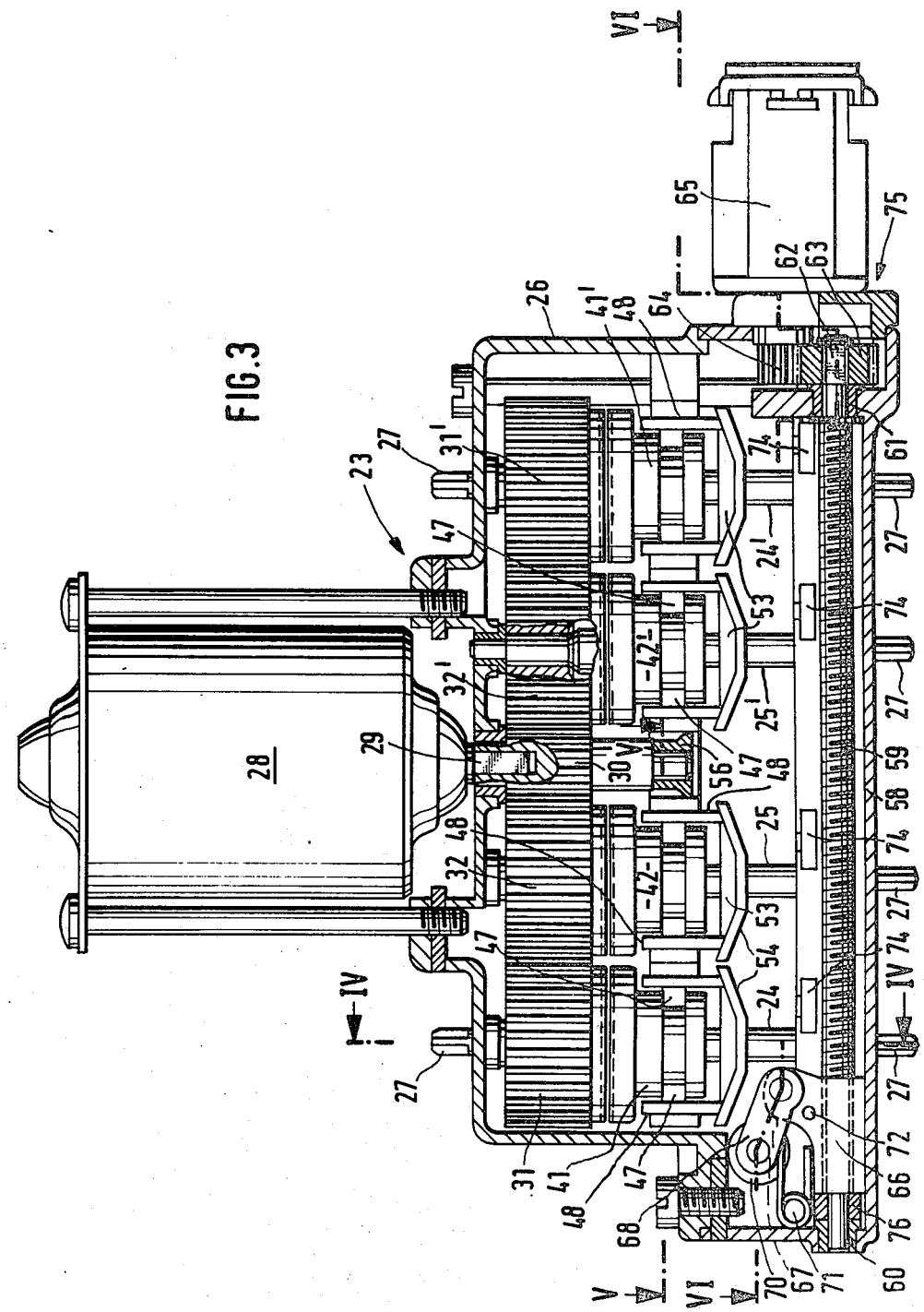

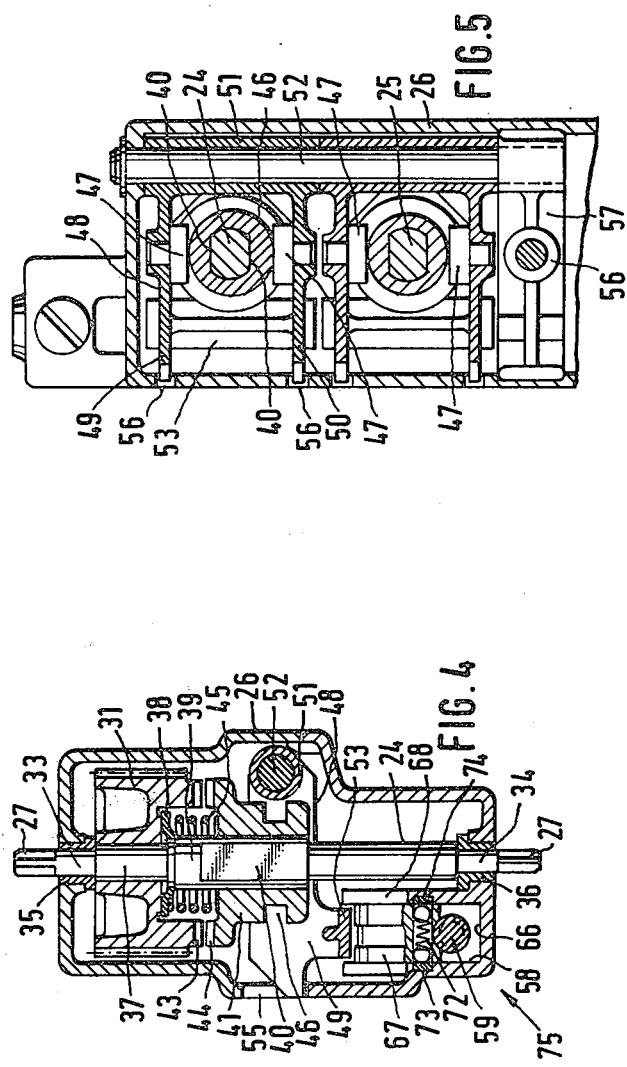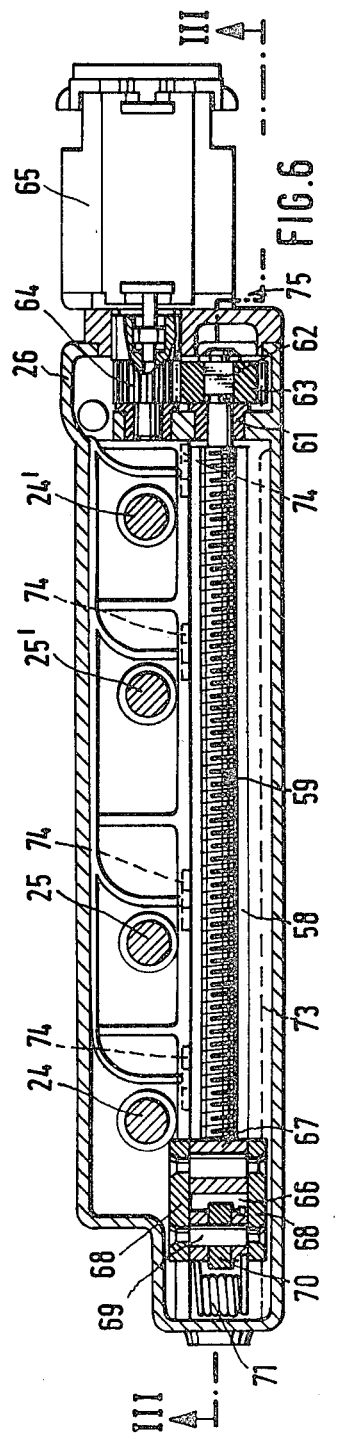

ADJUSTABLE SEAT PARTICULARLY IN MOTOR VEHICLES

BACKGROUND OF THE INVENTION

The present invention relates in general to adjustable seats and in particular to motor vehicles seats of the type and which include a seat frame adjustable in longitudinal direction and in vertical direction independently on the front part of the seat and on the rear part of the seat and also having reclinable backrest. Each of these adjusting movements is carried out by a separate adjuster and all adjusters being driven by a single driving motor via a power distributing device. The power distributing device is selectably oscillated by a plurality of couplings controlled by a control device.

Known are power distributing gears for seats of the aforedescribed type in which the control unit for the distributing gears is formed by a solenoid. Such solenoids have an annular configuration and are fixedly arranged in the housing of the distributing gear unit. Each of the solenoids cooperates with an assigned driving shaft of an adjuster in such a manner that when a current flows through the solenoid, the latter shifts a coupling disc which is axially displacable on the shaft but supported for joint resilator, into engagement with a gear supported for free rotation on the driving shaft. In other words, in prior art, power distributing gear units for driving shafts are arranged side by side in such a manner that at least two of the shafts are permanently in mesh with the pinion of the driving motor whereas the gears pertaining to the other driving shafts are in mesh with the first mentioned gears. Since all of the gears are supported for free rotation on respective driving shafts, the transmission of rotary movement takes place only via those driving shafts the solenoids of which are energized to couple the corresponding coupling discs with the opposite gear on the shaft. As soon as the solenoid is deenergized, a pressure spring arranged between the gear and the coupling disc disengages the latter and consequently the rotary movement from the gear is no longer transmitted to the driving shaft. The driving shaft can be connected to the assigned adjuster in the seat frame or in the backrest mount by means of flexible shafts for example. By switching on solenoids assigned to selected driving shafts, each of the adjusters can now be activated by a single driving motor and a separate drive for respective adjusters can now be dispensed with.

Such known electromagnetically controlled means for a power distributing gear unit are however, relatively expensive especially for the mass production as used in contemporary car industry. In addition, due to the heavy duty solenoids, the gear distributing unit has a very high weight. In addition, to install the solenoids in the housing of the unit, the installation room must be increased. In construction of motor vehicle seats however, the cost, weight, and installation space considerations are of substantial importance.

SUMMARY OF THE INVENTION

It is therefore a general object of the present invention to overcome the aforementioned disadvantages.

More particularly, it is an object of this invention to provide an improved adjustable motor vehicle seat, the control unit of which for controlling a plurality of position adjusters driven by a single driving motor is more economic to manufacture, has reduced weight and reduced installation space requirements with respect to prior art control units of this type.

In keeping with these objects, and others which will become apparent hereafter, one feature of the invention resides, in a control unit for power distributing gears driven by a single driving motor, in the provision of a coupling for each gear of the power distributing unit which is selectably controlled by mechanical elements operated by a separate adjustment motor activated independently from the driving motor.

In the preferred embodiment, the control unit of the power distributing gear unit is formed preferably of movable levers assigned aspectively to corresponding couplings on the driving shafts and a spindle or screw drive driven by the adjustment motor and displacing a nut which supports a cam follower which in turn activates via the aforementioned levers the individual gears. In this embodiment there is no longer necessary to provide a separate adjustment drive for each driving shaft for the adjuster. Furthermore, the mechanical control elements of the control unit can be assembled in a single row in a module interconnected by the screw drive to activate all driving shafts arranged in the power distributing gear unit. In this manner the cost of coupling means between the driving shafts and the assigned power distributing gears can be substantially reduced. The mechanical control elements can be economically manufactured by mass production methods and in addition, the installation space for such mechanical elements in the power distributing gear unit is substantially smaller than that required for solenoids. Reduction of weight resulting from the application of a single control unit suitable for activating all couplings of the driving shaft, is also considerable.

According to another feature of this invention, the adjustment levers in the control unit have a fork like shape whereby the arms of the fork like levers engage annular groove in the axially movable coupling disc. In this manner, the control lever can not only axially displace the coupling disc but also maintain the latter in the coupling position even during the rotation of the supporting driving shaft. The arms of the fork shaped control levers are furthermore bridged by V-shaped cam surfaces which during the travel of the guided nut of the screw drive are brought into engagement with a cam follower supported on the travelling nut and thus selectively come in and out of engagement with the corresponding distributing gear. Even if it is possible to make the travelling nut of the screw drive in the form of a slide shoe having a sliding surface for activating the control levers, it is of advantage when the friction between the slide shoe and the control lever is held at the lowest value. For this purpose, the spindle nut is guided in the housing of the power distributing gear unit to travel at a fixed position and supports a swingable lever which is spring biased and provided with a roller to act as a cam follower engaging the cam surfaces on the control levers.

Inasmuch as it is necessary that during the travels of the sliding shoe formed by the nut of the spindle drive only the selected adjusters can be driven by the driving motor to adjust the position of the seat frame or of the backrest while other adjusters must not be actuated, the guiding groove for the spindle nut is provided at one side thereof with a bus bar extending parallel to the spindle whereas the other side of the groove is provided with discrete contact pieces arranged at the respective coupling positions of the nut. The spindle supports also a contact spring which in each coupling position connects the bus bar to the corresponding contact piece and thus provides for an indication to the user that a position for activating a particular adjuster has been reached or the resulting impulse can be used for the automatic control of the seat adjustment.

As mentioned above, the screw or spindle drive is driven by a separate control motor. The spindle is supported for operation in the guiding groove formed in the housing of the gear unit and is provided at one end with a gear which is in mesh with the pinion of the adjustment motor. The transmission ratio between the gear of the spindle and the pinion of the motor is adjusted with respect to the pitch of the spindle so as to attain the optimum speed of travel of the spindle nut.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view of a motor vehicle seat having a horizontally and vertically adjustable seat frame and a reclinable backrest;

FIG. 2 is a top view of the adjustable seat frame driven by a single driving motor by means of a power distributing and control unit of this invention;

FIG. 3 is a side view of a power distributing gear unit equipped with the control unit and a separate control motor according to this invention;

FIG. 4 is a sectional side view of the gear and control unit of FIG. 3, taken along the line IV—IV;

FIG. 5 is another sectional side view of the unit of FIG. 3, taken along the line V—V; and FIG. 6 is a sectional top view of the unit of FIG. 3, taken along the line VI—VI.

DESCRIPTION OF THE PREFERRED EMBODIMENTS

Referring firstly to FIG. 1, the schematically illustrated motor vehicle seat includes a seat part 10 and a reclinable back rest 11 secured to the seat part by a hinge mount 20 and adjustable in position by an inclination adjuster 21. The seat part 10 together with the backrest 11 are mounted on a seat frame 12 which is vertically adjustable by means of swingable supports 13 arranged both at the front part and at the rear part of the seat frame. The swingable supports are preferably in the form of bell cranks the vertext of which is pivotably mounted on brackets 14 which are longitudinally displacable in stationary guide rails 17 secured to the floor of the vehicle. One arm of the support 13 is linked to the seat frame 12 and the other arm of each support 13 is hinged to the end of one of the threaded spindles 15. These spindles 15 are axially moved by adjusters 16 including a spindle nut in the form of a worm gear driven by a worm supported for rotation in the adjuster 16. Each adjuster 16 is fixed mounted on the bracket 14.

Another adjuster 18 of similar construction as the adjuster 16, that means having a spindle nut provided on its periphery with a worm gear and engaging a worm is secured to the brackets 14 and engages a stationary screw or spindle 19 secured to the floor of the vehicle and extending in the direction of guide rail 17. The adjuster 18 serves for the longitudinal displacement of the seat frame 12. The aforementioned adjuster 21 for the backrest is also power driven and is arranged between the hinged mount members on the backrest and the seat part.

The two vertical adjusters 16, the longitudinal adjuster 18 and the backrest adjuster 21 are connected by means of flexible shafts 22 to a power distributing gear unit 23 which as will be explained in detail below also includes the control unit of this invention. Since in this example four separate adjusters are employed for adjusting the desired position of the seat, the power distributing and control unit 23 has four driving shafts 24, 24', 25, and 25' as seen from FIG. 3. The housing 26 of the power distributing and control unit 23 supports a single driving motor 28, the shaft 29 of which supports for joint rotation a driving pinion 30 projecting into the interior of the housing 26 between a pair of driving shafts 25 and 25'. The other pair of driving shafts 24 and 24' is arranged parallel to and in alignment with the first mentioned pair and is provided with annular connecting pieces 27 projecting at both ends to the housing 26. Each of the driving shafts 24 through 25' supports for free rotation a gear 31, 31' and 32, 32'. The gears 32 and 32' which are assigned to the driving shafts 25 and 25' are permanently in mesh with the driving pinion 30 of the driving motor 28 whereas the gears 31 and 31' assigned to the consecutively arranged lateral driving shafts 24 and 24' are in permanent engagement with the adjoining gears 32 and 32'.

Each of the driving shaft 24 through 25' cooperates with an assigned mechanical control device which form together a compact control unit driven by a separate adjustment motor. The structure of a mechanical control device assigned to the driving shaft 24 will now be explained with reference to FIGS. 3, 4, and 5. Referring now to FIG. 4, the driving shaft 24 is shaped with end bearing pins 33 and 34 terminated with the aforementioned connecting rectangular pins 27. The bearing pins 33 and 34 are supported for rotation in bearing bushings 35 and 36 secured in the juxtaposed walls of the housing 26. The portion of the shaft which joins the bearing pin 33 is increased in diameter and supports for free rotation the gear 31. The latter gear is held in a fixed axial position in abutment with the end faces of the bearing bushing 35 by means of a washer 38 spring loaded by a pressure spring 45. The central portion 39 of the shaft 24 is still increased in diameter and is provided with two opposite flat surfaces 40 which engage correspondingly shaped flat surfaces in the central bore of a coupling disc 41. In this manner, the coupling disc is supported on the shaft portion 39 for axial displacement but for joint rotation with the latter. The biasing pressure spring 45 rests on the top end of the disc 41 and normally keeps the wheel 31 and the disc 41 apart from one another. The lower part of coupling disc 41 is extended in axial direction to form a sleeve which is provided on its outer periphery with an annular groove 46 for engaging two opposite sliding pieces 47 which are pivotably mounted on respective arms of a fork-like control lever 48. The fork arms 49 and 50 of the control lever are interconnected by a sleeve 51 which in turn is rotatably supported on a fixed axle 52 extending in longitudinal direction of the housing 26 and being secured at its ends to the latter. The free ends of respective fork arms 49 and 50 are interconnected by a V-shaped bridge defining two slanting cam surfaces 54. As seen from FIG. 4, the tips of fork-like lever arms 49 and 50 extend into a cut out 55 in the housing 26 whereby the lower edge of the cutout acts as a stop surface for the pivotable control lever 48 when the latter is urged by the spring 45 into its rest position in which the coupling disc 41 is out of engagement from the gear 31.

As mentioned before, the four driving shafts 24 through 25' support for free rotation the four power distributing gears 31 through 32' of which two are always in engagement with the pinion 30 of the driving motor 28. The shafts 25, 25' assigned to the latter gears 32 and 32' have only one connecting pin 27 projecting at one side of the housing 26 for accomodating the flexible shaft 22. Otherwise, the construction of the mechanical control devices pertaining to the shafts 25 and 25' and controlling the coupling and decoupling of the gear 32 and 32' to the shafts, is identical to the device as described in connection with the driving shaft 24. The control levers 48 of respective control devices are consecutively arranged for rotation on the axle 52 and one pair of the levers 48 is situated at one side of supporting web 57 integral with the housing 26 and the other pair of the control levers is arranged at the other side of the web. The web 57 is also formed with a blind bore 56 forming bearing for the driving pinion 30.

The bottom part of the housing 26 below the V-shaped cam surfaces 54 is formed into elongated guiding groove 58 extending parallel to the row of the driving shafts. The guiding groove 58 accomodates an elongated screw spindle 59 which at its ends is supported for rotation in bearing bushings 60 and 61 mounted in opposite walls of the gear unit housing 26. One end 62 of the spindle 59 has an non-circular cross section projecting beyond the bearing sleeve 61 and supports a gear 63 which is in mesh with the driving pinion 64 of a separate adjustment motor 65. The adjustment motor is secured to a lateral flange fastened to the housing 26 and the transmission ratio between the driving pinion 64 and the spindle gear 63 is adjusted to the pitch of the threads of the spindle so as to achieve the most suitable speed of travel of the spindle nut 66 displacable in the longitudinal guiding 58. The spindle nut has the shape of a sliding shoe which is held against rotational movement in the guide 58 so as to perform the rectilinear movement only. As seen from FIG. 3, the upper surface of the slide shoe 66 is provided with a pivotable link 67 which at its free end supports for rotation about an axle 69, a cam roller 70 which is biased upwardly by a biasing spring 71 which in this example has the form of a torsional spring. As seen from FIG. 4, a conductive contact spring 72 is arranged in a through hole in the slide shoe 66 above the spindle 59. The ends of the contact springs are bent into a contact yoke or provided with contact balls which are resiliently pressed against the opposite walls of the guiding groove 58. Referring now to FIG. 6, one of the walls of the groove 58 in the range of movement of the contact spring 72 is provided with a continuous bus conductor 73 whereas the opposite walls are provided with discrete contact pieces 74 located at positions at which sliding shoe engages the cam surfaces 54 of the control levers 48. In this manner, the contact pieces 74 are connected via the contact spring 72 with the bus conductor 73 to close a circuit for indicating the particular switching position of the slide shoe 66. This indicating signal which can be employed for controlling the driving motor 28. The control lever 48, the sliding shoe 66, the threaded spindle 59 and the adjustment motor 65 form together a machanical control device 75 which selectively controls the assigned one of coupling discs 41 through 42'.

If it is now desired to bring one of the driving shafts 24 through 25' into driving connection with the driving motor 28, the driving motor remains initially deenergized whereas the adjustment motor 65 is switched on. Consequently, the threaded spindle 59 is set in rotation and the sliding shoe 66 moves in the guiding groove 58 and consecutively brings into engagement respective coupling disc 41 with the corresponding gears 31, 32, 32' and 31' via the aforedescribed cam roller 70 and control levers 48. From the end position of the slide shoe 66 in abutment with the stop surface 76, the slide shoe travels to the right whereby the cam roller 70 first runs on the downwardly inclined cam surface 54 of the first control lever 48 and swings the latter upwardly. Simultaneously, the contact spring 72 connects conductive bar 73 with the first contact piece 74 and thus electrically indicates the engagement of the first coupling ring 41 with the gear 31. Provided however that the user wishes to activate the driving shaft 25', so he keeps the adjustment motor 65 in its working condition and the sliding shoe 66 continues its movement to the right successively activating the second control lever 48 assigned to the driving shaft 25 until the cam roller 70 displaces the cam surface of the third control lever assigned to the driving shaft 25' and swings the same upwardly to its coupling position. This coupling position is again indicated by closing the electrical circuit including the contact spring 72, the bar 73 and the corresponding contact piece 74 and upon to this indication the adjustment motor 65 is switched off. The switching off of the adjustment motor can be also carried out by a suitable electrical control device activated by the indication impulses resulting from the short circuit of the contact piece 74 assigned to the driving shaft 25' with the bus conductor 73 whereby while the adjustment motor 65 is disconnected, the driving motor 28 is switched on. As soon as the driving motor is energized, the driving pinion 30 starts to operate the directly engaged gears 32 and 32' as well as the indirectly engaged gears 31 and 31'. While the coupling disc 42 is now engaging the gear 32' and thus rotating the driving shaft 25', the remaining gears 31, 32 and 31' continue free rotation on the assigned driving shaft without bringing the latter into operation. The driving shaft 25' transmit its rotary movement via the flexible shaft 22 to the adjuster 18 which provides for a longitudinal displacement of the seat frame. As soon as the longitudinal position of the seat is adjusted, the driving motor 28 is disconnected and the adjustment motor 65 is now ready for displacing the sliding shoe 66 to engagement with control of another control device assigned for example either to the backrest adjuster 21 or to one of the vertical adjustors 16 for the rear or front range of the seat. The automatic switching device for automatically disconnecting the adjustment motor 65 while simultaneously connecting the driving motor 28 in response to switching impulse indicating the coupling position of the slide shoe can be made in any suitable manner well known in the art. This automatic switching circuit of course, can be dispensed with whereby the indicating impulse provides for a visual indication of be attained coupling positions of the control levers 48 whereby the operator manually disconnects the adjustment motor and activates the driving motor 28.

It will be understood that each of the elements described above, or two or more together, may also find a useful application in other types of constructions differing from the types described above.

While the invention has been illustrated and described as embodied in a specific embodiment of the power distributing and control unit, it is not intended to be limited to the details shown, since various modifications and structural changes may be made without departing in any way from the spirit of the present invention. For example, instead of the cam roller 70 which is rotatable on the link arm 68, it is possible to provide the upper surface of the sliding shoe 66 with rigid cam surface which activates the control lever 48. In addition, instead of driving the sliding shoe 66 by means of a screw drive 55 it is possible to use a hydraulic or pneumatic cylinder-and-piston unit for driving the slide shoe 66. In this case, a pump or a comprseeor is to be coupled to the adjustment motor 65 for driving this cylinder and piston unit. It will be also understood that the power transmitting gear 23 may be constructed with more or less driving shafts as in the illustrated example, in accordance with how many adjusters are to be controlled in the adjustable seat. Also, the adjusters themselves can be of any suitable design differing from that as illustrated in the drawings.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustable seat particularly for use in motor vehicles, including a plurality of position adjusters for the seat, a common driving motor, a power distributing gear unit having an input coupled to said driving motor and a plurality of driving shafts coupled to the assigned adjusters, comprising: a control unit arranged in said power distributing gear unit and including a separate adjustment motor and a plurality of mechanical control devices driven by said adjustment motor to selectably couple said driving shafts to said driving motor.

2. The adjustable seat as defined in claim 1, wherein each of the mechanical control devices of said control unit includes a coupling disc supported for joint rotation with the assigned driving shaft and being axially movable thereon to engage when activated, a freely rotating power distributing wheel driven by said driving motor, a sliding member displacable in the range of said coupling discs on respective driving shaft and driven by said adjustment motor, and means for controlling the coupling positions of said coupling discs in response to the movement of said sliding member.

3. The adjustable seat as defined in claim 2, wherein said means for controlling said coupling discs include rotatably supported control lever having a fork like configuration, the arms of said lever pivotably supporting sliding pieces for engaging an annular groove formed in the assigned coupling disc, and said control levers cooperating with said sliding member.

4. The adjustable seat as defined in claim 3, wherein the arms of each control lever are interconnected by a bridging piece defining sloping cam surfaces and said sliding member being providing with a counter acting cam member cooperating with said cam surfaces.

5. The adjustable seat as defined in claim 4, wherein said counteracting cam member includes a link pivotably supported on the sliding member, a cam roller supported for rotation of the free end of said link and being spring biased upwardly to engage the corresponding cam surfaces of said control lever.

6. The adjustable seat as defined in claim 2, wherein said control unit includes a longitudinal guiding groove extending along said driving shaft, said sliding member being in the form of a nut guided in said groove and engaging a threaded spindle driven by said adjustment motor.

7. The adjustable seat as defined in claim 6, wherein said guiding groove is provided at one side thereof with a bar conductor and on the opposite side thereof with discrete contact pieces and said sliding member including a spring biased contact member for connecting said bar conductor with respective contact pieces during the travel of the sliding member.

8. The adjustable seat as defined in claim 6, wherein said spindle is coupled to said adjustment motor via a transmission gear.

* * * * *